(12) United States Patent
Matsuoka et al.

(10) Patent No.: US 7,807,773 B2
(45) Date of Patent: Oct. 5, 2010

(54) BIODEGRADABLE POLYESTER RESIN COMPOSITION, PREPARATION METHOD THEREFOR, AND FOAMED ARTICLE AND MOLDED ARTICLE PRODUCED THEREFROM

(75) Inventors: Fumio Matsuoka, Uji (JP); Kazue Ueda, Uji (JP); Tatsuya Matsumoto, Uji (JP); Yutaka Oogi, Uji (JP)

(73) Assignee: Unitika Ltd., Hyogo (JP)

( * ) Notice: Subject to any disclaimer, the term of this patent is extended or adjusted under 35 U.S.C. 154(b) by 327 days.

(21) Appl. No.: 10/591,005

(22) PCT Filed: Mar. 4, 2004

(86) PCT No.: PCT/JP2004/002758

§ 371 (c)(1),
(2), (4) Date: Aug. 29, 2006

(87) PCT Pub. No.: WO2005/085346

PCT Pub. Date: Sep. 15, 2005

(65) Prior Publication Data

US 2007/0179253 A1 Aug. 2, 2007

(51) Int. Cl.
*C08G 63/02* (2006.01)

(52) U.S. Cl. ...................................... 528/272; 525/445
(58) Field of Classification Search .................. 528/272
See application file for complete search history.

(56) References Cited

U.S. PATENT DOCUMENTS

| | | | | |
|---|---|---|---|---|
| 3,997,512 A | * | 12/1976 | Casey et al. ................. | 528/285 |
| 5,952,433 A | * | 9/1999 | Wang et al. ................. | 525/415 |
| 6,075,118 A | * | 6/2000 | Wang et al. ................. | 528/354 |
| 6,150,490 A | * | 11/2000 | Deckwer et al. ............. | 528/80 |
| 2002/0128382 A1 | * | 9/2002 | Wang et al. ................. | 525/54.3 |

FOREIGN PATENT DOCUMENTS

JP 2003-128901 5/2003

OTHER PUBLICATIONS

U.S. Appl. No. 11/629,264, filed Jun. 2004, Shigeta et al.*

* cited by examiner

*Primary Examiner*—Randy Gulakowski
*Assistant Examiner*—Shane Fang
(74) *Attorney, Agent, or Firm*—Fildes & Outland, P.C.

(57) ABSTRACT

A biodegradable polyester resin composition which comprises a thermoplastic polymer comprising 100 parts by mass of an aliphatic polyester (A) and 0.01 to 5 parts by mass of a (meth)acrylic ester (B1) and/or a glycidyl ether (B2, and has a gelation index (1) of not lower than 0.1% and a gelation index (2) of not higher than 0.5%.

20 Claims, 3 Drawing Sheets

(a1)  (a2)

(b1)  (b2)

(c1)  (c2)

(d1)  (d2)

(e1)  (e2)

(f1)  (f2)

BIODEGRADABLE POLYESTER RESIN COMPOSITION, PREPARATION METHOD THEREFOR, AND FOAMED ARTICLE AND MOLDED ARTICLE PRODUCED THEREFROM

TECHNICAL FIELD

The present invention relates to a biodegradable polyester resin composition which comprises a crosslinked biodegradable polyester resin having an extremely low gel content and a high quality, and has excellent mechanical strength, excellent heat resistance and rheology which ensures advantageous production of articles by foaming, extrusion, injection molding, blow molding and the like with no problem in operability and quality, and a preparation method therefor, and a foamed article and a molded article produced therefrom.

BACKGROUND ART

Conventionally, plastics are used as materials for various containers such as bottles and trays and various molded components in many fields. However, the plastics cause social problems associated with waste disposal and environmental pollution, because the plastics are used in a tremendous amount and most of the plastics are not biodegradable.

On the other hand, biodegradable plastics have recently been studied. Among the biodegradable plastics, biodegradable aliphatic polyesters have come into practical use. However, such a biodegradable aliphatic polyester generally has a lower melting point and a lower melt viscosity and, hence, is lower in heat resistance and mechanical strength. Further, the biodegradable aliphatic polyester has a lower crystallization speed, thereby presenting problems of drawdown and an insufficient expansion ratio in molding. For practical use, the biodegradable aliphatic polyester is required to have an improved melt tensile force, a strain hardening property in measurement of elongational viscosity, and an improved crystallization speed.

In general, addition of a polymer having a higher polymerization degree and use of a polymer having longer chain branches are considered to be effective for imparting the resin with the strain hardening property. However, preparation of the higher polymerization degree polymer requires longer time for polymerization, resulting in lower productivity. Further, the higher polymerization degree polymer is liable to be colored and decomposed due to a longer-period thermal history. Further, there is known a method for preparing polylactic acid in a branched aliphatic polyester by adding a multifunctional polymerization initiator (JP-A-10-7778 and JP-A-2000-136256). However, this method is problematic in that the introduction of branched chains in the polymerization makes it difficult to extract the polymer and to flexibly change the branching degree.

On the other hand, numerous studies are conducted on a method of crosslinking a common biodegradable resin by melt-kneading the biodegradable resin with a peroxide or a reactive compound, because this method is simple and allows for flexible adjustment of the branching degree. Use of an acid anhydride and a polyvalent carboxylic acid as disclosed in JP-A-11-60928 is not practical, because there is a variation in reactivity and a reduced pressure is required. Use of a polyvalent isocyanate as disclosed in JP-B-2571329 and JP-A-2000-17037 is an impractical and unestablished technique, because the molecular weight is liable to be reduced in re-melting and there is some problem associated with safety in handling. Gelation by crosslinking with the use of an organic peroxide or with the use of an organic peroxide and two or more compounds having unsaturated bonds as disclosed in JP-A-10-324766 is liable to suffer from polymerization marks, and makes it difficult to extract the polymer because of its higher viscosity. In addition, the productivity is lower, and the colorization and the decomposition are liable to occur. Further, the presence of the gel disadvantageously reduces the qualities of molded articles and foamed articles.

On the other hand, the biodegradable aliphatic polyester suffers from lower productivity in molding because of its lower crystallization speed. However, no drastic measures are taken to cope with this, but addition of inorganic particles is an only approach now under consideration for improving the crystallization speed.

In view of these problems, the inventors of the present invention propose a biodegradable polyester resin composition as a useful material, and a foamed article and a molded article produced from the composition in JP-A-2003-128901. However, the composition, the foamed article and the molded article each have a relatively high gel content. This makes it difficult for these articles to have satisfactory appearance and quality, limiting applications of the articles.

DISCLOSURE OF THE INVENTION

To solve the aforementioned problems, it is an object of the present invention to provide a biodegradable polyester resin composition which is excellent in quality, mechanical strength and heat resistance and has rheology which ensures advantageous production of articles by foaming, extrusion, injection molding, blow molding and the like with no problem in operability, and to provide a preparation method for the composition and a foamed article and a molded article produced from the composition.

According to the present invention to attain the aforesaid object, a biodegradable polyester resin composition comprises a thermoplastic polymer comprising 100 parts by mass of an aliphatic polyester (A) and 0.01 to 5 parts by mass of a (meth)acrylic ester (B1) and/or a glycidyl ether (B2), and has a gelation index (1) of not lower than 0.1% and a gelation index (2) of not higher than 0.5%.

According to the present invention, the aliphatic polyester (A) is preferably a polylactic acid polymer. The inventive biodegradable polyester resin composition preferably has a melt viscosity of 0.2 to 10 g/10 minutes as expressed by a melt flow rate value.

A preparation method for the biodegradable polyester resin composition according to the present invention comprises the step of melt-kneading an aliphatic polyester (A), a (meth) acrylic ester (B1) and/or a glycidyl ether (B2), and an organic peroxide (C), whereby the biodegradable polyester resin composition is prepared as containing a thermoplastic polymer comprising 100 parts by mass of the aliphatic polyester (A) and 0.01 to 5 parts by mass of the (meth)acrylic ester (B1) and/or the glycidyl ether (B2) and having a gelation index (1) of not lower than 0.1% and a gelation index (2) of not higher than 0.5%.

In the inventive preparation method, it is preferred to melt-knead the aliphatic polyester (A), and inject a solution or a dispersion of the (meth)acrylic ester (B1) and/or the glycidyl ether (B2) and the organic peroxide (C) in the aliphatic polyester (A) during the melt-kneading of the aliphatic polyester (A), followed by agitating and kneading. It is also preferred to melt-knead the aliphatic polyester (A) and the organic peroxide (C), and inject a solution or a dispersion of the (meth) acrylic ester (B1) and/or the glycidyl ether (B2) in the resulting mixture during the melt-kneading of the aliphatic polyester (A) and the organic peroxide (C), followed by agitating and kneading.

In the inventive preparation method, a kneader is used. In the kneader, a lower pressure region is defined downstream of a region in which the aliphatic polyester (A) is melted, and the injection is carried out in the lower pressure region. The (meth)acrylic ester (B1) and/or the glycidyl ether (B2) are preferably agitated and kneaded in a position of the injection and/or downstream of the position of the injection with respect to a direction of flow of the melted resin in the kneader, so that the resulting biodegradable polyester resin composition has a gelation index (1) of not lower than 0.1% and a gelation index (2) of not higher than 0.5%.

A biodegradable resin molded article according to the present invention is produced by molding the biodegradable polyester resin composition by foaming, extrusion, injection molding or blow molding.

According to the present invention, the biodegradable polyester resin composition, which has a lower gel content, excellent mechanical strength and heat resistance and rheology advantageous for molding a foamed article and the like, can be easily prepared at lower costs. The article produced by the molding of this resin has a flat surface and good appearance, and examples thereof include articles produced by foaming with excellent foamability, articles produced by injection molding and blow molding with excellent moldability and articles produced by extrusion. The inventive biodegradable polyester resin composition and the inventive molded article are effectively and cleanly decomposed by natural decomposition, compost decomposition and the like. Thus, environmentally desirable articles can be provided with no problem.

DETAILED DESCRIPTION OF THE INVENTION

Figure 1:
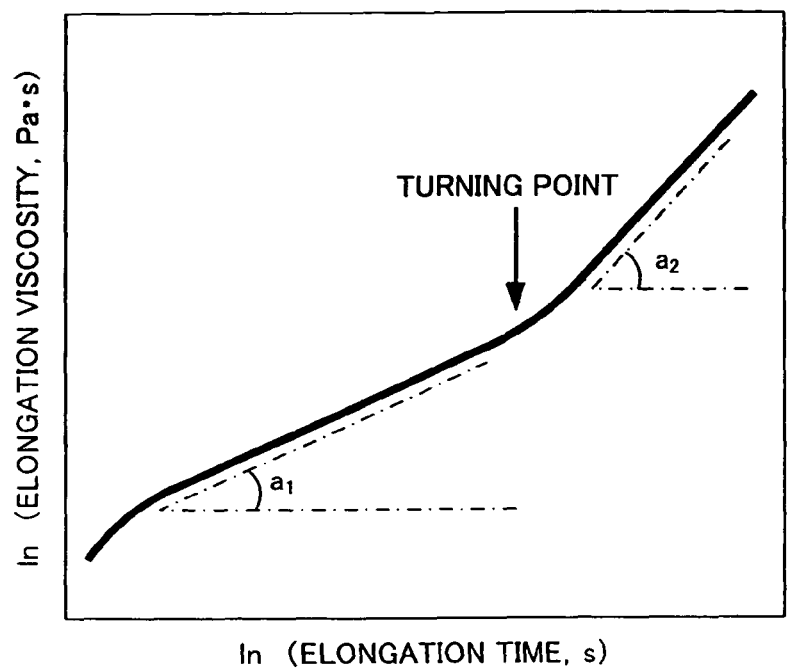
FIG. 1 is a diagram showing a relationship between the elongation time and the elongational viscosity for determining the ratio of an inclination a2 in a linear range at a latter stage of elongation after a turning point to an inclination a1 in a linear range at an initial stage of the elongation before the turning point (a2/a1: strain hardening coefficient)

An inventive biodegradable polyester resin composition is required to contain an aliphatic polyester (A), and a (meth) acrylic ester (B1) and/or a glycidyl ether (B2).

The aliphatic polyester (A) includes a thermoplastic aliphatic polyester as a major component thereof. Specific examples of the thermoplastic aliphatic polyester as the major component of the aliphatic polyester (A) include aliphatic polyesters which contain components derived from any of the following polymerizable aliphatic polyester materials in a proportion of not less than 70 mass %: (1) hydroxyalkylcarboxylic acids such as glycolic acid, lactic acid and hydroxybutylcarboxylic acid; (2) aliphatic lactones such as glycollide, lactide, butyrolactone and caprolactone; (3) aliphatic diols such as ethylene glycol, propylene glycol and butanediol; (4) polyalkylene glycols such as diethylene glycol, triethylene glycol, ethylene/propylene glycol, oligomers of polyalkylene ether such as dihydroxyethylbutane, polyethylene glycol, polypropylene glycol and polybutylene ether; (5) polyalkylene carbonate glycols such as polypropylene carbonate, polybutylene carbonate, polyhexane carbonate, polyoctane carbonate and polydecane carbonate, and their oligomers; and (6) aliphatic dicarboxylic acids such as succinic acid, adipic acid, suberic acid, azelaic acid, sebacic acid and decane dicarboxylic acid. The aliphatic polyester (A) may contain a block copolymer and/or a random copolymer of any of these aliphatic polyesters, a copolymer (block or random copolymer) of any of these aliphatic polyesters with not greater than 30 mass % of an additional component such as an aromatic polyester, a polyether, a polycarbonate, a polyamide, a polyurethane or polyorganosiloxane, or a mixture of the copolymers.

Among the aforesaid thermoplastic aliphatic polyesters, the aliphatic polyesters derived from the hydroxyalkylcarboxylic acids (1) each have a higher melting point and, hence, are preferred in terms of heat resistance.

Among these, polylactic acid, which has a higher melting point, is most suitable as the polymer associated with the present invention. The polylactic acid may be poly(L-lactic acid), poly(D-lactic acid), poly(D-, L-lactic acid), or a mixture of any of these polylactic acids. Among these polylactic acids, a polylactic acid containing optically active L- and D-lactic acid units in a proportion of not less than 90 mol % has a higher melting point and, therefore, is more preferable in terms of heat resistance. A copolymer obtained by copolymerizing the polylactic acid with a comonomer such as a hydroxycarboxylic acid or a lactone to an extent such as not to deteriorate the properties of the lactic polymer may be used. Examples of the copolymerizable hydroxycarboxylic acid and lactones include glycolic acid, 3-hydroxybutyric acid, 4-hydroxybutyric acid, 4-hydroxyvaleric acid, hydroxycaproic acid, glycollide, propiolactone, butyrolactone and caprolactone.

The lactic polymer may be prepared by polymerizing lactic acid by a conventionally known method. Examples of the polymerization method include direct dehydration and condensation of polylactic acid, and ring opening polymerization of lactide which is a cyclic dimer of lactic acid. These polymerization reactions may be carried out in a solvent and, as required, a catalyst and an initiator may be employed for effectively carrying out the reactions. The polymerization method may be properly selected in consideration of a required molecular weight and a required melt viscosity.

In the present invention, the aliphatic polyester (A) is required to contain any of the aforesaid thermoplastic aliphatic polyesters as the major component in a proportion of not less than 50 mass %, and may be a mixture of the same type or different types of the thermoplastic aliphatic polyesters.

The inventive biodegradable polyester resin composition can be prepared by melt-kneading the aliphatic polyester (A), the (meth)acrylic ester (B1) and/or the glycidyl ether (B2) as a crosslinking agent, and an organic peroxide (C) as a crosslinking assisting agent or a radical reaction initiator for reaction.

In the present invention, the (meth)acrylic ester (B1) is preferably a compound having two or more (meth)acryl groups or having one or more glycidyl groups or vinyl groups in its molecule, because such a compound is highly reactive with the biodegradable resin and has a lower residual monomer content, a relatively low toxicity and lower possibility of colorization of the resin. Specific examples of the compound include glycidyl methacrylate, glycidyl acrylate, glycerol dimethacrylate, trimethylolpropane trimethacrylate, trimethylolpropane triacrylate, allyloxypolyethylene glycol monoacrylate, allyloxypolyethylene glycol monomethacrylate, polyethylene glycol dimethacrylate, polyethylene glycol diacrylate, polypropylene glycol dimethacrylate, polypropylene glycol diacrylate and polytetramethylene glycol dimethacrylate (whose alkylene glycol portions may be copolymers of alkylenes having different lengths), butanediol methacrylate, and butanediol acrylate.

In the present invention, examples of the glycidyl ether (B2) include polyethylene glycol diglycidyl ether, polypropylene glycol diglycidyl ether, neopentyl glycol diglycidyl ether, trimethylolpropane polyglycidyl ether, polyglycidyl ethers prepared by adding not greater than 1 mol of epichlorohydrin to glycerol, and polyglycidyl ethers prepared by adding not greater than 2 moles of epichlorohydrin to ethylene glycol.

Where the (meth)acrylic ester (B1) is employed alone, the blend amount of the (meth)acrylic ester (B1) should be 0.01 to 5 parts by mass, preferably 0.05 to 3 parts by mass, based on 100 parts by mass of the aliphatic polyester (A). If the amount is less than 0.01 part by mass, it is impossible to improve mechanical strength, heat resistance and dimensional stability as intended by the present invention. On the other hand, if the amount is greater than 5 parts by mass, the crosslinking degree is excessively high, thereby reducing the operability.

Where the glycidyl ether (B2) is employed alone, the blend amount of the glycidyl ether (B2) should be 0.01 to 5 parts by mass, preferably 0.01 to 3 parts by mass, based on 100 parts by mass of the aliphatic polyester (A).

Where both the (meth)acrylic ester (B1) and the glycidyl ether (B2) are employed, the total amount of the (meth) acrylic ester (B1) and the glycidyl ether (B2) should be 0.01 to 5 parts by mass, preferably 0.05 to 3 parts by mass, based on 100 parts by mass of the aliphatic polyester (A).

In the present invention, the organic peroxide (C) is preferably added as the radical reaction initiator in the preparation process for the polyester resin composition. Examples of the organic peroxide (C) include benzoyl peroxide, bis(butylperoxy)trimethylcyclohexane, bis(butylperoxy)methylcyclododecane, butyl bis(butylperoxy)valerate, dicumyl peroxide, butyl peroxybenzoate, dibutyl peroxide, bis(butylperoxy)diisopropylbenzene, dimethyldi(butylperoxy)hexane, dimethyldi(butylperoxy)hexyne and butyl peroxycumene.

The blend amount of the organic peroxide (C) is preferably 0.01 to 10 parts by mass, more preferably 0.1 to 5 parts by mass, based on 100 parts by mass of the aliphatic polyester (A). If the blend amount is less than 0.01 part by mass, it is difficult to improve mechanical strength, heat resistance and dimensional stability as intended by the present invention. If the blend amount is greater than 10 parts by mass, an unused part of the blended organic peroxide is increased, leading to poor economy.

For heat resistance, the aliphatic polyester (A) preferably has a melting point of not lower than 100° C. If the melting point is lower than 100° C., the resulting resin composition has poorer heat resistance and, hence, disadvantageously has an extremely narrow application range. The upper limit of the melting point of the aliphatic polyester is not particularly limited, but about 230° C. The aliphatic polyester (A) preferably has a lower melt viscosity, because the branching degree in the crosslinking is increased. The aliphatic polyester (A) typically has a melt viscosity of about 3 to about 150 g/10 minutes as expressed by a melt flow rate value (hereinafter referred to as "MFR value") measured at a temperature of 190° C. with a load of 2.16 kg.

The biodegradable polyester resin composition is required to have a melt viscosity of 0.1 to 10 g/10 minutes as expressed by an MFR value. If the MFR value is less than 0.1 g/10 minutes, the fluidity of the resin is reduced, leading to lower operability. If the MFR value is greater than 10 g/10 minutes, the melt viscosity is too low, thereby reducing the mechanical properties of the resulting foamed and molded articles and the operability. The MFR value is preferably 0.2 to 10 g/10 minutes, more preferably 0.5 to 8 g/10 minutes, further more preferably 0.7 to 6 g/10 minutes.

In the present invention, the biodegradable polyester resin composition should have a gelation degree such that a gelation index (1) to be described later is not lower than 0.1% and a gelation index (2) to be described later is not higher than 0.5%. In the present invention, a gel means a three-dimensional network structure which is formed in the resin by crosslinking molecules of the resin by a crosslinking agent or a lower molecular weight monomer and causes the resin to lose fluidity to be hardened. The gel forms flaws like foreign matter in an article during the molding, deteriorating the appearance and quality of the article. Particularly, the size of gel particles is important. The inventive technique makes it possible to minimize the size of the gel particles. If the gel particles each have a diameter of not greater than 90 μm, for example, articles having excellent appearance and quality are produced by foaming and molding.

In the present invention, the gelation indexes are determined and defined in the following manner. About 10 g of two samples of a crosslinked resin composition or a sample of an article produced from the crosslinked resin composition by foaming or molding are respectively accurately weighed. In two 300-ml flasks, each sample and 250 ml of chloroform is poured respectively, and properly stirred at 20° C. under the atmospheric pressure for 12 hours for dissolving the samples. Then, the resulting solutions in the two flasks are each filtered through a 1480-mesh wire net and through a 200-mesh wire net by a suction filtering device. Substances remaining on the wire nets after the filtration are dried at 70° C. at 101.3 kPa (760 torr) for 8 hours in a vacuum dryer. The mass W1 of the dried substance (obtained by the filtration through the 1480-mesh wire net) and the mass W2 of the dried substance (obtained by the filtration through the 200-mesh wire net) are determined. In the present invention, the gelation index (1) is defined as the ratio $(W1/W0 \times 100)\%$ of the mass W1 to the mass W0 of the sample determined before the dissolution, and the gelation index (2) is defined as the ratio $(W2/W0 \times 100)\%$ of the mass W2 to the mass W0 of the sample determined before the dissolution.

The 1480-mesh wire net and the 200-mesh wire net respectively have mesh opening sizes of 10 μm and 90 μm. If there are a great number of gel particles having very small particle sizes ranging from 10 μm to 90 μm, the elongational viscosity of the resin composition is advantageously improved. On the other hand, gel particles having sizes greater than 90 μm are secondarily coagulated in re-melting to have further greater sizes, so that the sizes of the gel particles should be not greater than the predetermined level. Therefore, the gelation index (1) related to the gel particles having sizes not smaller than 10 μm should be not lower than 0.1%, and the gelation index (2) should be not higher than 0.5% for limiting the amount of the gel particles having sizes greater than 90 μm. A resin composition containing a greater amount of larger gel particles provides foamed articles and molded articles which are poor in appearance and quality. In the present invention, therefore, the gelation index (1) should be not lower than 0.1%, more preferably not lower than 0.2%, most preferably not lower than 0.3%, and the gelation index (2) should be not higher than 0.5%, more preferably not higher than 0.4%, most preferably not higher than 0.3%.

The inventive biodegradable resin composition preferably has a strain hardening property such that, in a logarithmic plot curve of the time versus the elongational viscosity, as shown in FIG. 1, obtained by elongational viscosity measurement performed at a temperature higher by 10° C. than the melting point of the biodegradable resin composition, a strain hardening coefficient as defined by the ratio (a2/a1) of an inclination a2 in a linear range at a latter stage of elongation after a turning point to an inclination a1 in a linear range at an initial stage of the elongation before the turning point is not less than 1.05 and less than 50. The strain hardening coefficient is more preferably 1.5 to 30.

If the strain hardening coefficient is less than 1.05, cells in the foamed article are liable to be broken during the foaming, and the foamed article is liable to have an uneven wall thickness. On the other hand, if the strain hardening coefficient is not less than 50, the gel particles are liable to be coagulated during the molding, so that the fluidity is remarkably reduced and the moldability is deteriorated.

Figure 2:
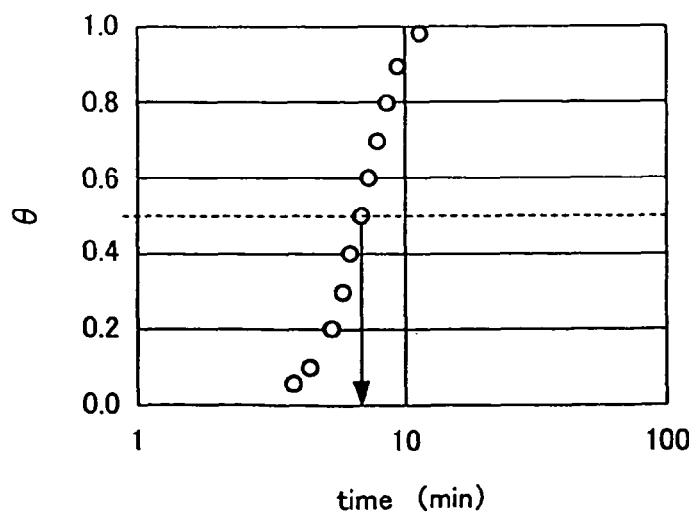
FIG. 2 is a diagram showing a relationship between the crystallinity (θ) and the time for determining a crystallization speed coefficient which is defined as time (minute) required for the crystallinity to reach one half a final crystallinity level (θ)

The inventive biodegradable resin composition preferably has a crystallization speed index of not greater than 50 minutes as measured by melting the resin composition at 200° C. and then isothermally crystallizing the resin at 130° C. in a DSC device. The crystallization speed index is herein defined as time (minute) required for the crystallinity to reach one half a final crystallinity level θ, as shown in FIG. 2, when the resin melted at 200° C. is crystallized at 130° C. A lower crystallization speed index means a higher crystallization speed. If the crystallization speed is lower with a crystallization speed index of greater than 50 minutes, the crystallization requires excessively long time. Therefore, the molded article fails to have an intended shape, and the cycle time in injection molding is increased, resulting in reduced productivity. On the other hand, if the crystallization speed is too high with an excessively low crystallization speed index, the moldability is deteriorated. Therefore, the lower limit of the crystallization speed index is preferably about 0.1 minute. The crystallization speed index is reduced to accelerate the crystallization, as the amount of the crosslinking agent and/or the amount of the peroxide are increased. Further, the crystallization speed index is reduced to accelerate the crystallization, as the number of functional groups in the crosslinking agent is increased. By adding any of the following nucleating agents as a crystal nucleating agent, the crystallization speed index is synergistically reduced to accelerate the crystallization.

Examples of the nucleating agents include inorganic compounds such as diatomite, calcinated pearlite, kaoline zeolite, bentonite, clay, silica particles, borax, zinc borate, aluminum hydroxide, talc, glass, limestone, calcium silicate, calcium sulfate, calcium carbonate, sodium hydrogen carbonate, magnesium carbonate, aluminum oxide and ferric carbonate, and organic compounds including organic fillers such as charcoal, cellulose, starch, citric acid and cellulose derivatives. These may be used in combination. The amount of the nucleating agent to be added is preferably 0.1 to 10 mass %. If the amount of the nucleating agent is less than 0.1 mass %, the nucleating agent fails to provide its effect. If the amount of the nucleating agent is greater than 10 mass %, the effect of the addition is reduced.

The crosslinking agent, the crosslinking assisting agent, the peroxide and other additives to be used with the inventive resin composition are desirably supplied by dry blend or by means of a powder feeder if provided in a solid form, and injected to a kneader by means of a liquid injection pump if provided in a liquid form.

In this case, the (meth)acrylic ester and/or the glycidyl ether and the peroxide may be injected together or separately injected. More specifically, it is preferred to inject a solution or a dispersion of the (meth)acrylic ester and/or the glycidyl ether during the melt-kneading of the aliphatic polyester resin and the peroxide, or to inject a solution or a dispersion of the (meth)acrylic ester and/or the glycidyl ether and the peroxide during the melt-kneading of the aliphatic polyester resin, followed by further melt-kneading. From the viewpoint of convenience of metering, it is particularly preferred to dissolve or disperse the (meth)acrylic ester and/or the glycidyl ether as the crosslinking agent and the peroxide in a medium and then inject the resulting solution to the kneader. In this case, the operability is drastically improved.

The medium in which the (meth)acrylic ester and/or the glycidyl ether as the crosslinking agent and the peroxide as the crosslinking assisting agent are dissolved or dispersed is not particularly limited, but a common medium may be used. The medium is preferably a plasticizer which is excellent in compatibility with the inventive aliphatic polyester and biodegradable. The plasticizer may be at least one selected from a derivative of an aliphatic polycarboxylate, a derivative of an ester of an aliphatic polyol, a derivative of an aliphatic oxyester, a derivative of an aliphatic polyether and a derivative of an aliphatic polyether polycarboxylate. Specific examples of these compounds include dimethyl adipate, dibutyl adipate, triethylene glycol adipate, triethylene glycol diacetate, methyl acetyl ricinoleate, acetyl tributyl citrate, polyethylene glycol and dibutyl diglycol succinate. The amount of the plasticizer to be used is preferably not greater than 20 parts by mass, more preferably 0.1 to 10 parts by mass, based on 100 parts by mass of the resin. If the crosslinking agent has a lower reactivity, the plasticizer is not necessary. If the crosslinking agent has a higher reactivity, the amount of the plasticizer is preferably not smaller than 0.1 part by mass.

In the present invention, a heat stabilizer, a deglossing agent, a pigment, a plasticizer, an antifading agent, a weather proofing agent, a lubricant, an antioxidant, an antibacterial agent, an antistatic agent, a fragrant material, a dye, a terminal blocking agent, a surfactant, a flame retardant, a surface modifier, an inorganic electrolyte, an organic electrolyte, a filler and the like may be added to the biodegradable polyester resin composition, as long as the properties of the resin composition are not deteriorated. Examples of the heat stabilizer and the antioxidant include hindered phenols, phosphorus compounds, hindered amines, sulfur compounds, copper compounds and halides of alkali metals, and mixtures of any of these compounds. Examples of an inorganic filler include talc, calcium carbonate, warrastonite, zinc carbonate, diatomite, calcinated pearlite, kaoline zeolite, bentonite, clay, silica particles, borax, zinc borate, aluminum hydroxide, glass, limestone, calcium silicate, calcium sulfate, sodium hydrogen carbonate, magnesium carbonate, magnesium oxide, sodium aluminate, calcium aluminate, sodium aluminosilicate, magnesium silicate, glass balloon, carbon black, zinc oxide, antimony trioxide, hydrotalcite, aluminum oxide, ferric carbonate, metal fibers, metal whiskers, ceramic whiskers, potassium titanate, boron nitride, graphite, glass fibers and carbon fibers. Examples of an organic filler include naturally occurring polymers such as charcoal, cellulose, starch, wood powder, bean curd refuse, chaff, wheat bran and cellulose derivatives, and products obtained by modifying these polymers.

Next, a preparation method for the inventive biodegradable polyester resin composition will be described. However, the preparation method is not limited to the following method.

The inventive biodegradable polyester resin composition can be prepared by melt-kneading the thermoplastic polymer containing the aliphatic polyester (A) as the major component and the (meth)acrylic ester (B1) and/or the glycidyl ether (B2) as the crosslinking agent in an extruder for the reaction. Either a single screw melt kneader or a twin screw melt kneader may be used as a machine base for the melt-kneading and the reaction, but the twin screw kneader is generally most useful. Exemplary screws for the twin screw kneader include a deep double thread screw, a standard double thread screw and a triple thread screw, and any of these screws may be employed.

When any of these melt kneaders is used, it is essential to inject the crosslinking agent to a lower pressure region defined downstream of a region in which the polymer is supplied and melted. In the present invention, the lower pressure region is defined as a region which has a pressure substantially reduced by provision of a normal lead deep screw portion as compared with a preceding screw portion.

The injection of the solution or the dispersion obtained by dissolving or dispersing the (meth)acrylic ester and/or the glycidyl ether as the crosslinking agent and the peroxide in the medium by means of a high pressure liquid metering pump makes it possible to stably prepare the resin composition with improved operability. The injection of the solution containing the crosslinking agent into the lower pressure region ensures stable supply of the solution and hence stable production. Further, it is necessary to provide a kneading section including normal lead mixing disks, neutral mixing disks, reverse lead mixing disks and the like.

Figure 3:
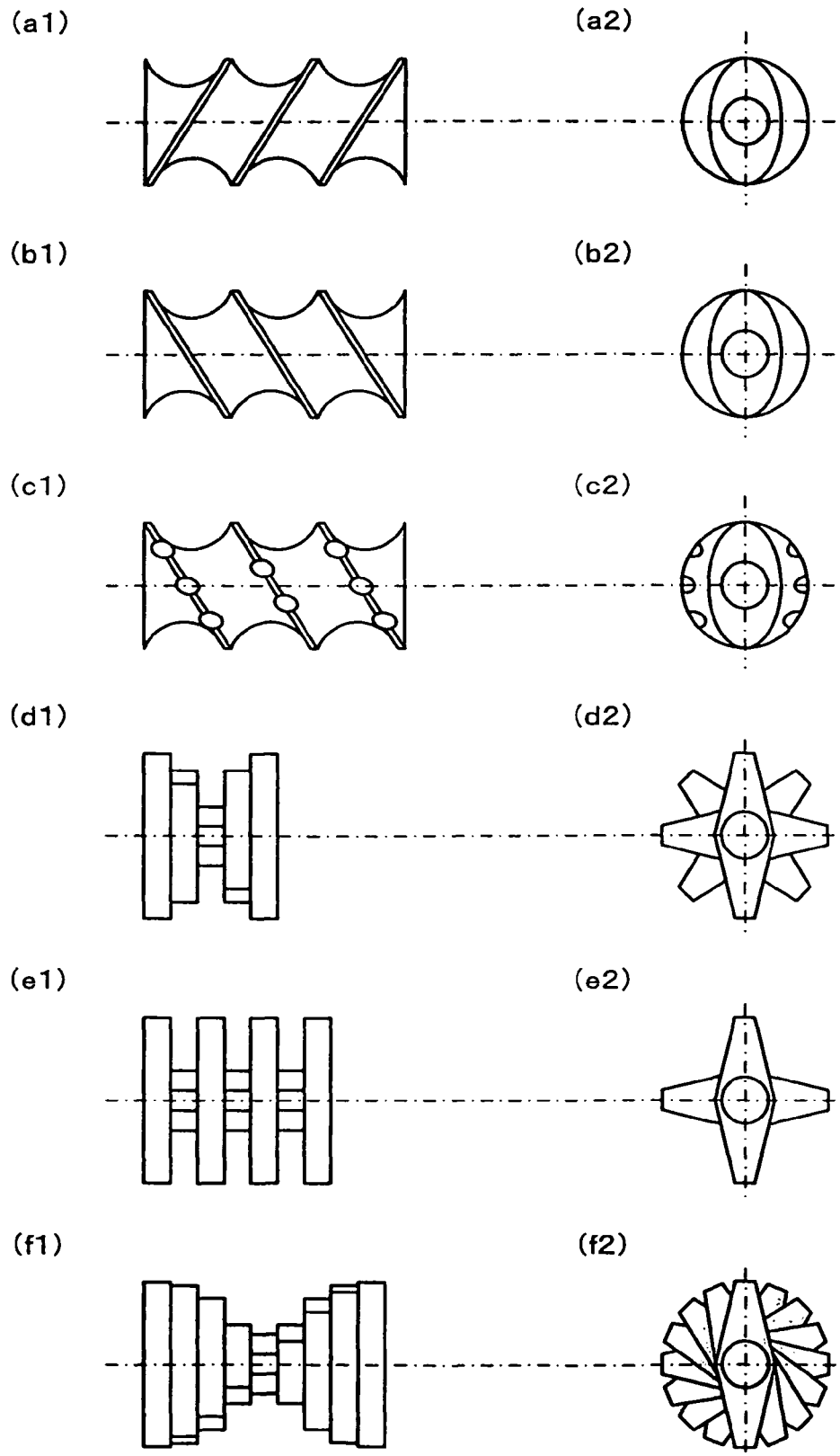
FIGS. 3(a1) to 3(f2) are diagrams illustrating typical screw parts for a twin screw kneader in the present invention.

FIG. 3 shows diagrams illustrating exemplary screw parts for a kneader of a double thread screw type. In FIG. 3, (a1) and (a2) illustrate a reverse lead screw (hereinafter sometimes referred to simply as (a)), (b1) and (b2) illustrate the most common normal lead screw (hereinafter sometimes referred to simply as (b)), (c1) and (c2) illustrate a normal lead notch screw (hereinafter sometimes referred to simply as (c)), (d1) and (d2) illustrate normal lead kneading disks (hereinafter sometimes referred to simply as (d)), (e1) and (e2) illustrate neutral kneading disks (hereinafter sometimes referred to simply as (e)), and (f1) and (f2) illustrate reverse lead kneading disks (hereinafter sometimes referred to simply as (f)).

The normal lead screws and disks are provided for normal transport. The reverse lead screw and disks are provided for reverse transport and resin seal. The neutral disks have an intermediate function between the normal lead disks and the reverse lead disks, and serve to knead the melted resin at their positions. The neutral kneading disks include wider disks, which have grinding effect in the kneading.

The kneading strength is reduced in the following order: (f)>(e)>(a)>(d)>(c)>(b). By providing the aforesaid screws and disks in combination or increasing the number of the screws and the disks, the effect of kneading the resin is increased.

Figure 4:
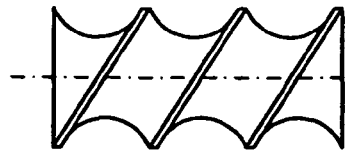
FIGS. 4(a1) to 4(f2) are diagrams illustrating other typical screw parts for the twin screw kneader in the present invention.
Figure 4:
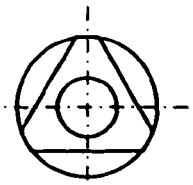
Figure 4:
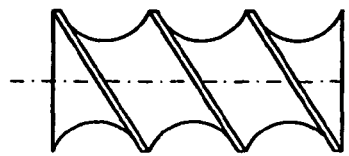
Figure 4:
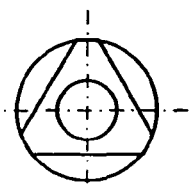
Figure 4:
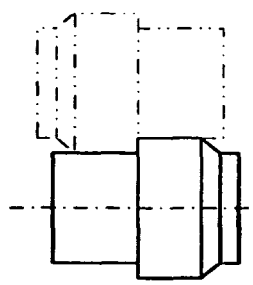
Figure 4:
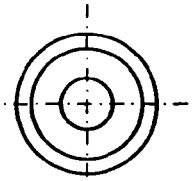
Figure 4:
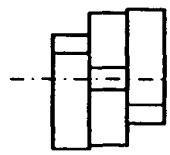
Figure 4:
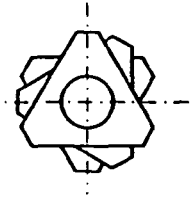
Figure 4:
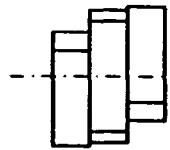
Figure 4:
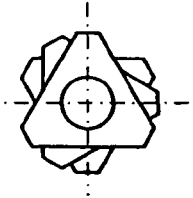
Figure 4:
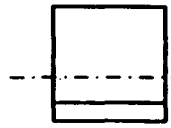
Figure 4:
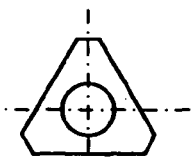

FIG. 4 shows diagrams illustrating screw parts for a kneader of a triple thread screw type. In FIG. 4, (a1) and (a2) illustrate a reverse lead screw, (b1) and (b2) illustrate a normal lead screw, (c1) and (c2) illustrate a seal ring, which has a predetermined seal function when a pair of such seal rings are provided in opposite orientations in the twin screw kneader as shown in (c1), (d1) and (d2) illustrate normal lead kneading disks, (e1) and (e2) illustrate reverse lead kneading disks, and (f1) and (f2) illustrate neutral kneading disks.

In the present invention, it is necessary to provide a kneading section which includes the normal lead kneading disks, the neutral kneading disks, the reverse lead kneading disks, the normal lead screw, the reverse lead screw, a stop ring and the like in desired combination. For improvement of the kneading degree and the dispersibility, it is particularly preferred to use two or more normal lead kneading disks, two or more neutral kneading disks and the reverse lead kneading disk in combination. Of course, vent suction mechanisms may be provided upstream and downstream of the kneading section for removing moisture and volatile components. In this case, the seal ring, the reverse lead screw and a notched mixing screw may be used in combination with the normal lead screw.

For the preparation of the inventive biodegradable polyester resin composition, the aliphatic polyester (A) is heated to be melted at a temperature in the range between (melting point (mp)+10)° C. and (melting point (mp)+60)° C. in an extruder having the aforesaid screw arrangement, and then the (meth)acrylic ester (B1) and/or the glycidyl ether (B2) as the crosslinking agent is injected. The resulting resin is rapidly kneaded with the rotation speed of the screws adjusted at 50 to 300 rpm, and extruded from an end of a die to form strands. The strands are cooled and cut into pellets. Since the reaction with the crosslinking agent is sensitive, the acceleration of the crosslinking reaction and the dispersion of the crosslinking agent are extremely important. By rapidly increasing the kneading degree and the dispersing degree, the generation of the larger gel particles can be suppressed.

In the present invention, more specifically, the aforesaid screw parts are selectively employed for the extruder, and the operation temperature and the screw rotation speed for the operation are properly selected, whereby the resin can be sufficiently agitated in the crosslinking agent injecting position and immediately downstream of the crosslinking agent injecting position to suppress the generation of the larger gel particles. Therefore, it is necessary to provide a screw part having a higher agitating capability in the crosslinking agent injecting position or immediately downstream of the crosslinking agent injecting position. Once the larger gel particles are generated, it is difficult to disintegrate the larger gel particles. Therefore, it is important to disintegrate the gel particles during growth of the gel particles to prevent the generation of the larger gel particles. Further, where the reverse lead screw part and the seal ring are provided upstream of the crosslinking agent injecting position with respect to the resin flow direction in the extruder for sealing, reduction of the amount of the injected crosslinking agent is prevented which may otherwise occur due to suction of the crosslinking agent through a vent suction port.

Thus, the resulting biodegradable polyester resin composition is free from larger gel particles, so that articles having excellent appearance and quality can be produced from the resin composition by foaming and molding.

If the screw rotation speed is lower than 50 rpm, the kneading degree and the dispersing degree will be reduced. Therefore, larger gel particles are liable to be generated, thereby reducing the quality of the articles produced by foaming and molding. On the other hand, if the screw rotation speed is higher than 300 rpm, the shearing of the resin by the screw is enhanced, thereby reducing the viscosity of the entire polymer. Therefore, the screw rotation speed is preferably 50 to 300 rpm, more preferably 100 to 250 rpm, further more preferably 120 to 230 rpm.

Any of common foaming methods may be employed for the foaming of the biodegradable polyester resin composition for production of the foamed article according to the present invention. For example, a thermally decomposable foaming agent which is decomposable at the melting point of the resin is preliminarily blended with the resin, and the resulting mixture is extruded into a sheet from a slit die or a circular die, or extruded into strands from a multiplicity of round holes by means of an extruder. Examples of the thermally decomposable foaming agent include azo compounds such as azodicarbonamides and barium azodicarboxylates, nitroso compounds such as N,N'-dinitrosopentamethylenetetramine, hydrazine compounds such as 4,4'-oxybis(benzene sulfonyl hydrazide) and hydrazicarbonamide, and inorganic foaming agents such as sodium hydrogen carbonate. Alternatively, a volatile foaming agent may be injected from a middle portion of the extruder for foaming the resin. Examples of the volatile foaming agent include inorganic foaming agents of inert gases such as carbon dioxide, nitrogen, and air, and organic solvents typified by hydrocarbons such as propane, butane, hexane, and methane, fluorinated compounds, and alcohols such as ethanol and methanol. Further, foamed particles may be produced by preparing particles of the resin composition, impregnating the resin particles with the organic solvent, water or a like foaming agent, and changing the temperature and/or the pressure to foam the resin particles.

Where the biodegradable polyester resin composition contains neither of the foaming nucleating agent and the foaming assisting agent or a small amount of the foaming nucleating agent and/or the foaming assisting agent for the production of the foamed article, it is also important to properly blend the foaming nucleating agent and/or the foaming assisting agent for adjustment of cells during the foaming. The blending method is not particularly limited, but may be properly selected according to the form of the foaming nucleating agent and/or the foaming assisting agent. More specifically, where the foaming nucleating agent and/or the foaming assisting agent are supplied in the form of powder or master batch, these agents are dry-blended and supplied, for example, by means of a Nauter mixer or a tumbler mixer, or directly supplied into the extruder by means of a powder feeder. Where the foaming nucleating agent and/or the foaming assisting agent are supplied in the form of master batch, these agents are mixed with other materials and supplied into the extruder by means of a metering mixing device such as having a jet collar.

Any of the aforesaid crystal nucleating agents may be used as the foaming nucleating agent. The amount of the foaming nucleating agent to be added is preferably 0.1 to 10 mass %. If the amount is less than 0.1 mass %, the resulting foamed article will be unsatisfactory with a smaller number of cells. If the amount is greater than 10 mass %, the cells will be easily broken, making it difficult to increase the expansion ratio.

Examples of the foaming assisting agent include calcium stearate, magnesium stearate and stearic acid. The amount of the foaming assisting agent to be added is preferably 0.01 to 2 mass %. If the amount is less than 0.01 mass %, the effect of the addition of the foaming assisting agent will not be provided. On the other hand, if the amount is greater than 2 mass %, the growth of foaming nuclei and cells will be hindered.

Next, description will be given to an extrusion method to be employed for producing an article from the biodegradable polyester resin composition by extrusion according to the present invention. A T-die method or a circular die method may be employed in the extrusion method. The extrusion should be carried out at not lower than the melting point (Tm) or the fluidizing temperature of the biodegradable polyester resin composition. The extrusion temperature is preferably in the range of $(Tm+10)°$ C. to $(Tm+60)°$ C., more preferably in the range of $(Tm+15)°$ C. to $(Tm+40)°$ C. If the extrusion temperature is too low, the extrusion is liable to be unstable and suffer from overload. On the other hand, if the extrusion temperature is too high, the biodegradable polyester resin is liable to be decomposed, and the resulting article is liable to have a reduced strength and be colored. Exemplary articles to be produced by the extrusion include biodegradable sheets and pipes. For improvement of the heat resistance of these articles, a heat treatment may be performed on the articles at a temperature of not lower than the glass transition temperature (Tg) of the biodegradable polyester resin composition and not higher than $(Tm-20)°$ C.

Specific examples of applications of the biodegradable sheets and pipes produced by the extrusion include material sheets for deep drawing, containers, pads for iron containers, boxes, partition plates for boxes, cushioning materials, binders, cut files, clear files, cut boxes, antibacterial stationery for a clean room, cards such as credit cards, core materials for partitions, sign boards, buffer wall materials, camping floor boards, door mats, toilet mats, kitchen mats, bath mats, garden mats, mats for hospitals, screen materials, fences such as animal rejection fences for dogs and cats, fish net buoys, fishing floats, oil fence buoys, cooler boxes, straws, and agricultural and horticultural pipes. Food containers, agricultural and horticultural containers, blister packages, press-through packages and the like can be produced from the biodegradable sheet by vacuum forming, air pressure forming or vacuum air pressure forming. In the forming, the sheet is preferably preheated to a sheet temperature of $(Tg+40°$ C.) to $(Tm-5°$ C.) and, immediately thereafter, shaped in a mold kept at a temperature of 20° C. to $(Tm-20°$ C).

If the temperature of the preheated sheet is too high, the sheet is drawn down, so that the sheet forming is impossible. If the temperature of the preheated sheet is too low, the sheet is liable to have insufficient stretchability and to be cracked, making the deep drawing impossible. On the other hand, if the mold temperature is too low, the resulting container is liable to have insufficient heat resistance. If the mold temperature is too high, the sheet is liable to adhere to the mold, making it difficult to properly demold the resulting article. Further, the article is liable to have an uneven wall thickness and a reduced shock resistance.

Although the shapes of the food containers, the agricultural and horticultural containers, the blister packages and press-through packages are not particularly limited, the sheet is preferably deep-drawn to a depth of not smaller than 2 mm to contain food, articles and medicines. The wall thicknesses of the containers are not particularly limited, but preferably not smaller than 50 μm, more preferably 150 to 1000 μm for strength. Specific examples of the food containers include fresh food trays, instant food containers, fast food containers and lunch boxes. Specific examples of the agricultural and horticultural containers include seeding pots. Specific examples of the blister packages include food containers as well as packages for various commodities including stationery, toys and dry batteries.

Description will be given to a blow molding method to be employed for producing an article from the biodegradable polyester resin composition by blow molding according to the present invention. Examples of the blow molding method include a direct blow molding method in which the article is molded directly from the material resin, an injection blow molding method in which a preform (bottomed parison) is first prepared by injection molding and then blow-molded, and a draw blow molding method. Further, a hot parison method in which a preform is blow-molded immediately after preparation of the preform, or a cold parison method in which a preform is once cooled and taken out and then reheated to be blow-molded may be employed.

A temperature for the blow molding is preferably (Tg+20° C.) to (Tm−20° C). If the blow molding temperature is lower than (Tg+20° C.), the molding will be difficult, and the resulting blow-molded container is liable to have insufficient heat resistance. On the other hand, if the blow molding temperature is higher than (Tm−20° C.), the resulting blow-molded container is liable to have an uneven wall thickness, and draw-down is liable to occur due to reduction of viscosity.

Description will be given to an injection molding method for producing an article from the biodegradable polyester resin composition by injection molding according to the present invention. An ordinary injection molding method as well as a gas injection molding method, an injection press molding method and the like may be employed as the injection molding method. A cylinder temperature for the injection molding should be not lower than the melting point (Tm) or the fluidizing temperature of the biodegradable polyester resin composition as the material resin, preferably (Tm+10)° C. to (Tm+60)° C., more preferably (Tm+15)° C. to (Tm+40)° C. If the molding temperature is too low, short molding will occur to result in unstable molding, and overload is liable to occur. On the other hand, if the molding temperature is too high, the biodegradable polyester resin composition is liable to be decomposed and, therefore, the resulting injection-molded article is liable to have a reduced strength and to be colored. The temperature of a mold is preferably not higher than (Tm−20° C.). Where the crystallization of the biodegradable polyester resin in the mold is to be promoted for increasing the heat resistance of the biodegradable polyester resin, the mold temperature is preferably kept at a temperature of (Tg+20° C.) to (Tm−20° C.) for a predetermined period and then cooled to not higher than Tg. Where post-crystallization is required, heat treatment is preferably performed again at a temperature of Tg to (Tm−20° C.) after the mold is cooled to not higher than Tg.

The type of the injection-molded article produced by the injection molding method is not particularly limited, but specific examples thereof include tableware such as dishes, bowls, pots, chopsticks, spoons, forks and knives, containers for fluids, container caps, stationery such as rulers, writing utensils, clear cases and CD cases, daily commodities such as sink corner strainers, trash boxes, washbowls, tooth brushes, combs and hangers, agricultural and horticultural materials such as flower pots and seeding pots, toys such as plastic models, electrical appliance resin components such as air conditioner panels, refrigerator trays and housings, and automotive resin components such as bumpers, interior panels and door trims. The shapes of the containers for fluids are not particularly limited, but the containers preferably each have a depth of not smaller than 20 mm for containing the fluids. The wall thicknesses of the containers are not particularly limited, but are preferably not smaller than 0.1 mm, more preferably 0.1 to 5 mm, for strength. Specific examples of the containers for fluids include drinking cups and beverage bottles for milk beverages, cold beverages and alcoholic beverages, temporary storage containers for seasonings such as soy sauce, sauce, mayonnaise, ketchup and cooking oil, containers for shampoo and rinse, cosmetic containers, and agricultural containers.

EXAMPLES

The present invention will hereinafter be described specifically by way of examples. In the following examples and comparative examples, various properties were measured and evaluated in the following manner.

Molecular Weight

The molecular weight was determined at 40° C. with the use of tetrahydrofuran as an eluent by means of a gel permeation chromatography (GPC) device (available from Shimadzu Co., Ltd.) having a differential refractometer, and expressed on the basis of polystyrene calibration standards.

Glass Transition Temperature and Melting Point (° C.)

A fusion absorption curve was determined at a temperature increase rate of 20° C./min by means of Perkin Elmer's differential scanning colorimeter DSC-7, and temperatures respectively providing an initial extreme value and an extreme value were defined as the glass transition temperature and the melting point.

Melt Viscosity (MFR) (g/10 min)

In conformity with JIS K7210, the melt viscosity was measured under conditions F specified in Table 1 of Appendix A.

Elongational Viscosity

An elongational viscosity measurement device RME (available from Rheometric Corp.) was used. A 60 mm×7 mm×1 mm test strip was prepared and, with opposite ends thereof being supported by metal belt clamps, elongated at a strain rate of 0.1 $\sec^{-1}$ at a temperature higher by 10° C. than the melting point of the resin composition thereby to be elongated. During the elongation, a torque acting on a pinch roller is detected for determination of the elongational viscosity.

Strain Hardening Coefficient (a2/a1) (see FIG. 1)

The strain hardening coefficient was determined by calculating the ratio (a2/a1) of an inclination a2 in a linear range at a latter stage of elongation after a turning point to an inclination a1 in a linear range at an initial stage of the elongation before the turning point in a graph logarithmically plotted between the elongation time and the elongational viscosity.

Crystallization Speed Index (see FIG. 2)

With the use of a DSC device (Pyrisl DSC available from Perkin Elmer Corporation), a sample was heated at a rate of +500° C./min from 20° C. to 200° C., and kept at 200° C. for 5 minutes. Then, the sample was cooled at a rate of −500° C./min from 200° C. to 130° C., and kept at 130° C. for crystallization. With the final crystallinity defined as 1, time required for the crystallinity to reach 0.5 was determined as the crystallization speed index (minute).

Flexural Modulus

In conformity with ASTM-790, a 150 mm×10 mm×6 mm test strip was prepared, and the flexural modulus was measured with a load being applied to the test strip at a deformation rate of 1 mm/min.

Apparent Density (g/cm³)

A foamed product was immersed in water, and an apparent increase in volume of the water was determined as the volume of the foamed product. The apparent density was calculated by dividing the mass of the foamed product by the volume determined in the aforesaid manner.

Expansion Ratio

The expansion ratio was calculated by dividing the actual density of the resin of the foamed product by the apparent density of the foamed product.

Appearance of Foamed Product

The foamed product was visually inspected, and evaluated. The results of the evaluation were represented by the following symbols.

⊚: A highly uniform flat surface having good appearance.
○: A uniform flat surface free from roughness.
Δ: A partly uneven flat surface free from roughness.
x: An uneven flat surface roughened by breakage of cells.

Flexural Modulus (MPa)

In conformity with JIS K7171, a test strip having a length of 80±2.0 mm and a width of 10.0±0.2 mm was prepared, and the flexural modulus was measured with a load being applied to the test strip at a deformation rate of 2 mm/min.

Evaluation of Injection Moldability

With the use of an injection molding machine (IS-100E available from Toshiba Machine Co., Ltd.), the resin was injection-molded in a releasable cup mold (having a diameter of 38 mm and a height of 300 mm with a mold temperature of 15° C.) at a molding temperature of 200° C., and a cycle time required for proper release of a cup was determined. Further, the appearance of the resulting molded article was visually inspected and evaluated. The results of the evaluation were represented by the following symbols.

⊚: A highly uniform surface substantially free from gelation.
○: A uniform surface substantially free from gelation.
Δ: A partly uneven surface slightly suffering from gelation.
x: An uneven surface suffering from gelation.

Evaluation of Blow Moldability

With the use of a blow molding machine (ASB-50 HT available from Nissei ASB Co., Ltd.), a preform having a diameter of 30 mm, a height of 100 mm and a thickness of 3.5 mm was prepared at a molding temperature of 200° C. Thereafter, the preform was heated to a surface temperature of 80° C., and blown in a bottle-shaped mold (having a diameter of 90 mm and a height of 250 mm), thereby providing a molded article having a wall thickness of 0.35 mm. The appearance of the molded article was visually inspected and evaluated. The results of the evaluation were represented by the following symbols.

⊚: A highly uniform surface having good appearance as intended.
○: A uniform surface having good appearance substantially as intended.
Δ: A partly uneven surface having appearance substantially as intended.
x: An uneven surface having unintended appearance.
xx: The molding was impossible.

Evaluation of Biodegradability

A test piece (having a length of 10 cm, a width of 5 cm and a thickness of 2 cm) was sampled, and composted in a fermentable compost of kitchen garbage in conformity with ISO14855. That is, the test piece was treated in the compost at a temperature of 58° C. for 45 days, and then dug out of the compost. On the basis of the biodegradation ratio of the test piece, the biodegradability was evaluated. Further, the test piece was visually inspected. Thus, the biodegradability was comprehensively evaluated, and the results of the evaluation were represented by the following symbols.

x: The shape of the test piece did not change at all, and the biodegradation ratio was lower than 10%.

Δ: The shape of the test piece was maintained, and the biodegradation ratio was not lower than 10% and lower than 40%.
○: A part or half of the test piece was decayed, and the biodegradation ratio was not lower than 40% and lower than 70%.
⊚: The test piece was mostly decayed, and the biodegradation ratio was not lower than 70%.

Ingredients used in the following examples and comparative examples are as follows.

(A) Biodegradable Polyester Resin

A1: Poly(L-lactic acid) (having a weight average molecular weight of 100,000, an L-lactic acid ratio of 99 mol %, a D-lactic acid ratio of 1 mol % and a crystallization speed index of 95, and available from Cargill Dow Corporation)

A2: Poly(L-lactic acid) (having a weight average molecular weight of 100,000, an L-lactic acid ratio of 90 mol %, a D-lactic acid ratio of 10 mol % and a crystallization speed index of greater than 100)

A3: A copolyester resin containing butanediol, adipic acid and terephthalic acid in a ratio (molar ratio) of 50/27.8/22.2, and having a glass transition temperature of −28° C., a melting point of 110° C. and an MFR of 10 g/10 minutes A4: Polybutylene succinate adipate [PBSA] (containing butanediol, succinic acid and adipic acid in a ratio (molar ratio) of 100/80/20, and having a glass transition temperature of −45° C., a melting point of 105° C. and an MFR of 25 g/10 minutes)

A5: Polybutylene succinate [PBS] (containing butanediol and succinic acid in a ratio (molar ratio) of 50/50, and having a glass transition temperature of −32° C., a melting point of 115° C. and an MFR of 30 g/10 minutes)

(B1) (Meth)acrylic Ester

PEGDM: Polyethylene glycol dimethacrylate (available from Nippon Oil & Fats Co., Ltd.)
TMPTM: Trimethylolpropane trimethacrylate (available from Nippon Oil & Fats Co., Ltd.)
PEGDA: Polyethylene glycol diacrylate (available from Nippon Oil & Fats Co., Ltd.)
GM: Glycidyl methacrylate (available from Nippon Oil & Fats Co., Ltd.)

(B2) Glycidyl Ether

PEGDGE: Polyethylene glycol diglycidyl ether (available from Nippon Oil & Fats Co., Ltd.)

(C) Peroxide

C1: Di-t-butyl peroxide (available from Nippon Oil & Fats Co., Ltd.)
C2: 2,5-dimethyl-2,5-bis(t-butylperoxy)hexyne-3 (available from Nippon Oil & Fats Co., Ltd.) which was dissolved in acetyl tributyl citrate as a plasticizer and used in the form of a 10% solution Example 1

With the use of a twin screw kneader having double thread screws (TEM-37BS available from Toshiba Machine Co., Ltd.), a resin composition was prepared. The twin screw kneader was constructed in the following manner. A deep normal lead screw and a shallow normal lead screw were provided in a resin feeding section. Downstream of the resin feeding section, two neutral kneading disks and a reverse lead screw were provided, and a normal lead screw portion was further provided, in which a liquid was injected. A kneading section including screws and kneading disks as shown in FIG. 3 was define immediately downstream of the normal lead screw portion. More specifically, (d), (d), (e), (e), (d), (d), (e), (b), (c) and (a) were provided in this order in the kneading section. The kneader was constructed so as to allow the ingredients to pass through the kneading section and, after vent suction, extrude the resulting resin composition into strands from a die including three holes each having a diameter of 0.4 mm.

Thus, the twin screw kneader was prepared. Then, 1.0 mass % of talc having an average particle diameter of 2.5 μm was dry-blended as a crystallization nucleating agent with the biodegradable polyester resin A1, and the resulting mixture was supplied to the twin screw kneader at a temperature of 200° C. The strands extruded from the kneader were cooled in a cooling bath, and cut by a pelletizer. Thus, pellets of the biodegradable polyester resin were prepared. The injected liquid was a solution containing polyethylene glycol dimethacrylate (PEGDM) as the (meth)acrylic ester (B1), the peroxide C1 and acetyl tributyl citrate as a diluent in a weight ratio of 1/2/5. The solution was injected into the twin screw kneader under the conditions shown in Table 1 by means of a liquid metering pump. In the extrusion from the kneader, the extrusion rate was 20 kg/hr, and the rotation speed of the screw was 150 rpm. The resulting composition was dried, and the properties of the composition were determined. The results are shown in Table 1.

TABLE 1

| | | Example | | | | |
|---|---|---|---|---|---|---|
| | | 1 | 2 | 3 | 4 | 5 |
| Ingredients for biodegradable polyester resin composition | | | | | | |
| Biodegradable polyester resin | Type | A1 | A1 | A1 | A1 | A1 |
| | Proportion | 100 | 100 | 100 | 100 | 100 |
| (Meth)acrylic ester | Type | PEGDM | PEGDM | PEGDM | PEGDM | PEGDM |
| | Part by mass | 0.2 | 0.5 | 3.0 | 0.05 | 0.5 |
| Glycidyl ether | Type | — | — | — | — | — |
| | Part by mass | — | — | — | — | — |
| Peroxide | Type | C1 | C1 | C1 | C1 | C2 |
| | Part by mass | 0.4 | 0.1 | 0.5 | 2.0 | 1.0 |
| Properties of resin composition | | | | | | |
| Melting point (° C.) | | 168 | 167 | 165 | 166 | 166 |
| MFR (g/10 min) | | 1.2 | 0.6 | 0.2 | 0.4 | 0.7 |
| Strain Hardening coefficient | | 2.2 | 2.5 | 3 | 2 | 2.4 |
| Crystallization speed index (min) | | 1.0 | 1.5 | 1.4 | 0.9 | 1.5 |
| Gelation index 1 (%) | | 0.5 | 0.9 | 1.8 | 1.5 | 0.8 |
| Gelation index 2 (%) | | 0.2 | 0.3 | 0.5 | 0.4 | 0.3 |
| Flexural modulus (MPa) | | 4090 | 4110 | 4150 | 4000 | 4100 |
| Foamed product | | | | | | |
| Expansion ratio | | 8 | 9 | 10 | 10 | 9 |
| Appearance | | ⊚ | ⊚ | ○ | ○ | ⊚ |
| Molded product | | | | | | |
| Injection molding cycle (sec) | | — | 21 | — | — | — |
| Appearance of injection-molded product | | — | ⊚ | — | — | — |
| Blow moldability | | — | ○ | — | — | — |
| Biodegradability | | — | ⊚ | — | — | — |

| | | Example | | | | |
|---|---|---|---|---|---|---|
| | | 6 | 7 | 8 | 9 | 10 |
| Ingredients for biodegradable polyester resin composition | | | | | | |
| Biodegradable polyester resin | Type | A1 | A1 | A1 | A1 | A2 |
| | Proportion | 100 | 100 | 100 | 100 | 100 |
| (Meth)acrylic ester | Type | — | TMPTM | PEGDA | GM | PEGDM |
| | Part by mass | — | 0.2 | 0.2 | 0.5 | 0.1 |
| Glycidyl ether | Type | PEGDGE | — | — | — | — |
| | Part by mass | 0.2 | — | — | — | — |
| Peroxide | Type | C1 | C1 | C1 | C1 | C1 |
| | Part by mass | 1.0 | 0.4 | 1.0 | 0.1 | 0.2 |
| Properties of resin composition | | | | | | |
| Melting point (° C.) | | 165 | 166 | 167 | 167 | No m.p. |
| MFR (g/10 min) | | 2.0 | 1.6 | 1.2 | 0.4 | 1.0 |
| Strain Hardening coefficient | | 2.6 | 2.7 | 2.7 | 3.1 | 2.3 |
| Crystallization speed index (min) | | 1.1 | 1.2 | 1.2 | 1.3 | 0.8 |

TABLE 1-continued

|  | Example 7 | Example 8 | Example 9 | Example 10 | Example (5th col) |
|---|---|---|---|---|---|
| Gelation index 1 (%) | 0.3 | 0.4 | 0.5 | 1.6 | 0.5 |
| Gelation index 2 (%) | 0.1 | 0.2 | 0.2 | 0.4 | 0.2 |
| Flexural modulus (MPa) | 3870 | 3650 | 3660 | 3720 | 1980 |
| *Foamed product* | | | | | |
| Expansion ratio | 7 | 8 | 8 | 10 | 8 |
| Appearance | ⊚ | ⊚ | ⊚ | ○ | ⊚ |
| *Molded product* | | | | | |
| Injection molding cycle (sec) | 23 | 22 | — | — | — |
| Appearance of injection-molded product | ⊚ | ⊚ | — | — | — |
| Blow moldability | ○ | ○ | — | — | — |
| Biodegradability | — | — | — | — | — |

|  |  | Example 11 | Example 12 | Example 13 | Example 14 | Example 15 |
|---|---|---|---|---|---|---|
| *Ingredients for biodegradable polyester resin composition* | | | | | | |
| Biodegradable polyester resin | Type | A1/A3 | A1/A4 | A1/A5 | A5 | A1 |
|  | Proportion | 50/50 | 50/50 | 50/50 | 100 | 100 |
| (Meth)acrylic ester | Type | PEGDM | PEGDM | PEGDM | PEGDM | PEGDM |
|  | Part by mass | 0.2 | 0.2 | 0.2 | 0.1 | 0.2 |
| Glycidyl ether | Type | — | — | — | — | PEGDGE |
|  | Part by mass | — | — | — | — | 0.2 |
| Peroxide | Type | C1 | C1 | C1 | C1 | C1 |
|  | Part by mass | 0.4 | 0.4 | 0.4 | 0.2 | 0.5 |
| *Properties of resin composition* | | | | | | |
| Melting point (° C.) | | 110 | 105 | 115 | 115 | 167 |
| MFR (g/10 min) | | 1.2 | 1.4 | 1.2 | 2.1 | 0.8 |
| Strain Hardening coefficient | | 2.2 | 2.3 | 2.4 | 2.2 | 2.3 |
| Crystallization speed index (min) | | 1.0 | 0.7 | 1.7 | 1.3 | 1.4 |
| Gelation index 1 (%) | | 0.5 | 0.4 | 0.5 | 0.2 | 0.7 |
| Gelation index 2 (%) | | 0.3 | 0.2 | 0.2 | 0.1 | 0.3 |
| Flexural modulus (MPa) | | 1560 | 1480 | 2110 | 1360 | 4100 |
| *Foamed product* | | | | | | |
| Expansion ratio | | 8 | 8 | 8 | 6 | 9 |
| Appearance | | ⊚ | ⊚ | ⊚ | ⊚ | ⊚ |
| *Molded product* | | | | | | |
| Injection molding cycle (sec) | | 20 | — | — | — | 20 |
| Appearance of injection-molded product | | ⊚ | — | — | — | ⊚ |
| Blow moldability | | ○ | — | — | — | ○ |
| Biodegradability | | ○ | ○ | ○ | ○ | ⊚ |

|  |  | Comparative Example 1 | Comparative Example 2 | Comparative Example 3 | Comparative Example 4 | Comparative Example 5 |
|---|---|---|---|---|---|---|
| *Ingredients for biodegradable polyester resin composition* | | | | | | |
| Biodegradable polyester resin | Type | A1 | A1 | A2 | A1 | A1 |
|  | Proportion | 100 | 100 | 100 | 100 | 100 |
| (Meth)acrylic ester | Type | — | PEGDM | — | PEGDM | — |
|  | Part by mass | — | 3.0 | — | 6.0 | — |
| Glycidyl ether | Type | — | — | — | — | — |
|  | Part by mass | — | — | — | — | — |
| Peroxide | Type | C1 | — | C1 | C1 | — |
|  | Part by mass | 5.0 | — | 0.5 | 11.0 | — |
| *Properties of resin composition* | | | | | | |
| Melting point (° C.) | | 165 | 165 | No m.p. | 165 | 167 |
| MFR (g/10 min) | | 36.5 | 38.0 | 37.0 | *1) | 32.0 |
| Strain Hardening coefficient | | *1) | *1) | 1.0 | *1) | *1) |
| Crystallization speed index (min) | | 68 | 83 | >100 | 0.06 | 110 |
| Gelation index 1 (%) | | 0.05 | 0.00 | 0.00 | — | 0.00 |

TABLE 1-continued

|  |  |  |  |  |  |
|---|---|---|---|---|---|
| Gelation index 2 (%) | 0.0 | 0.0 | 0.0 | — | 0.0 |
| Flexural modulus (MPa) | 3170 | 3030 | 2840 | — | 2600 |
| Foamed product | | | | | |
| Expansion ratio | 2.5 | 2.2 | 2.5 | — | 3.0 |
| Appearance | X2) | X2) | Δ | — | Δ |
| Molded product | | | | | |
| Injection molding cycle (sec) | 37 | 48 | — | — | 76 |
| Appearance of injection-molded product | ⊚ | ○ | — | — | ⊚ |
| Blow moldability | X | X | — | — | XX |
| Biodegradability | ⊚ | — | ⊚ | — | — |

*1) Impossible to measure,
X2) Breakage of cells

Next, a foaming test was performed. In the foaming test, liquid carbon dioxide gas was used as the foaming agent. With the use of a continuous extrusion sheet foam forming apparatus (twin screw kneader PCM-45 (available from Ikegai Co., Ltd.) including a circular die having a lip width of 0.7 mm and a hole diameter of 65 mm), a sheet foam was formed under the following conditions: an extrusion temperature of 200° C., a cooling zone temperature of 150° C., a die temperature of 160° C., and an extrusion rate of 20 kg/hr. At this time, the concentration of the carbon dioxide gas was changed to ensure a maximum expansion ratio for the sheet formation. The results are shown in Table 1.

Examples 2 to 15 and Comparative Examples 1 to 5

Compositions were prepared in substantially the same manner as in Example 1, except that the biodegradable polyester resins (A), the (meth)acrylic esters (B1), the glycidyl ethers (B2) and the peroxides (C) were blended in different amounts in different combinations as shown in Table 1. Further, the foaming test was performed in the same manner as in Example 1. In Examples 10 to 14, the cooling zone temperature and the die temperature were respectively set to levels lower by 20° C. than those employed in Example 1 in the foaming test. The properties of the resulting compositions and the results of the foaming test are shown in Table 1.

The results of the evaluation of the injection moldability and the blow moldability of each of the biodegradable polyester resin compositions obtained in Examples 2, 6, 7, 11, 15 and Comparative Examples 1, 2, 5 are shown in Table 1. The results of the evaluation of the biodegradability are also shown in Table 1.

As apparent from Table 1, the compositions of Examples 1 to 9 and 15 each contained the (meth)acrylic ester (B1) and/or the glycidyl ether (B2) as the crosslinking agent in addition to the biodegradable polyester resin (A) and, therefore, were excellent in flexural modulus. The extruded foamed products each had fine closed cells each having a smaller cell diameter and were substantially free from larger gel particles with a lower gelation index 2 and, therefore, had good appearance.

The extruded foamed products of Examples 10 to 14, though containing different biodegradable polyester resins, each had a practical flexural modulus. Further, the extruded foamed products each had fine closed cells each having a smaller cell diameter and were substantially free from larger gel particles with a lower gelation index 2 and, therefore, had good appearance. Particularly, the extruded foamed products of Examples 11 to 14 were flexible with a lower flexural modulus and substantially free from larger gel particles with a lower gelation index 2, and each had fine closed cells each having a smaller cell diameter.

The resin compositions of Examples 1 to 15 each had a lower crystallization index, i.e., a higher crystallization speed, and provided excellent products by the injection molding and the blow molding.

The resin compositions of Comparative Examples 1, 3, 5 each had a lower strain hardening coefficient without improvement in melt viscosity and mechanical strength such as flexural modulus, because neither of the (meth)acrylic ester (B1) and the glycidyl ether (B2) was contained as the crosslinking agent. Although an attempt was made to produce a foamed product from each of these resins, production of satisfactory foamed products was impossible.

The resin composition of Comparative Example 2 also had a lower strain hardening coefficient without improvement in mechanical strength such as flexural modulus, because the peroxide (C) was not used. Although an attempt was made to produce a foamed product from the resin composition, production of a satisfactory foamed product was impossible.

Examples 16 to 19 and Comparative Examples 6 to 8

The screw arrangement in the kneading section and the screw rotation speed in Example 1, which are previously described, are also shown in Table 2.

In contrast, the screw arrangement in the kneading section and the screw rotation speed were changed in Examples 16 to 19 and Comparative Examples 6 to 8 as shown in Table 2. Resin compositions were prepared in substantially the same manner as in Example 1 except for these points. The properties of the resulting compositions, the results of the molding of the compositions and the biodegradability of the compositions are shown in Table 2.

TABLE 2

|  | Example | | | | | Comparative Example | | |
|---|---|---|---|---|---|---|---|---|
|  | 1 | 16 | 17 | 18 | 19 | 6 | 7 | 8 |
| Conditions for preparation | | | | | | | | |
| Screw arrangement in kneading section | d, d<br>e, e<br>d, d<br>e<br>b<br>c<br>a | b<br>b<br>d, d<br>e<br>b<br>c<br>a | b<br>b<br>b, b<br>d, d<br>b<br>c<br>a | d, d<br>e, e<br>f, f<br>e<br>b<br>c<br>a | d, d<br>e, e<br>f, f<br>e<br>b<br>c<br>a | b<br>b<br>b, b<br>d<br>b<br>c<br>a | b<br>b<br>b, b<br>d<br>b<br>c<br>a | d, d<br>e, e<br>f, f<br>e<br>b<br>c<br>a |
| Screw rotation speed (rpm) | 150 | 150 | 150 | 100 | 200 | 150 | 250 | 350 |
| Properties of resin composition | | | | | | | | |
| Melting point (° C.) | 168 | 167 | 167 | 166 | 167 | 166 | 167 | 165 |
| MFR (g/10 min) | 1.2 | 1.1 | 1.3 | 1.0 | 2.2 | 13.2 | 15.6 | 34.0 |
| Strain Hardening coefficient | 2.2 | 2.5 | 3 | 2 | 2.4 | 1.3 | 0.8 | Impossible to measure |
| Crystallization speed index (min) | 1.0 | 1.5 | 1.2 | 1.3 | 2.2 | 10.5 | 23.4 | 85.0 |
| Gelation index 1 (%) | 0.5 | 0.6 | 0.4 | 0.5 | 0.5 | 2.5 | 1.4 | — |
| Gelation index 2 (%) | 0.2 | 0.3 | 0.1 | 0.2 | 0.2 | 1.1 | 0.6 | — |
| Flexural modulus (MPa) | 4090 | 4060 | 4050 | 4070 | 3980 | — | — | — |
| Foamed product | | | | | | | | |
| Expansion ratio | 8 | 8 | 9 | 8 | 8 | 3 | 2.5 | — |
| Appearance | ◎ | ◎ | ◎ | ◎ | ◎ | Δ | X | — |
| Molded product | | | | | | | | |
| Injection molding cycle (sec) | — | 21 | — | — | 20 | — | 24 | — |
| Appearance of injection-molded product | — | ○ | — | — | ◎ | — | Δ | — |
| Blow moldability | — | ○ | — | — | ◎ | — | Δ | — |
| Biodegradability | — | ◎ | — | — | — | — | ◎ | — |

In Examples 16 to 19, the kneading section had a screw arrangement including kneading disks such as the normal lead kneading disks and the neutral kneading disks, and the reverse lead screw and the normal lead screw in combination, and the screw rotation speed was higher, whereby the kneading and the dispersion were properly achieved to accelerate the crosslinking reaction.

Therefore, resin compositions each having a higher melt viscosity, a higher strain hardening coefficient and a lower crystallization speed index were obtained as in Example 1. These resin compositions were substantially free from larger gel particles, and included minute gel particles distributed therein. Further, the mechanical strength typified by the flexural modulus was improved.

The resulting foamed products each had fine closed cells each having a smaller diameter, and good appearance. The production of molded products was properly achieved by the injection molding method as well as the blow molding method.

In Comparative Example 6, a smaller number of kneading disks were provided, so that relatively large gel particles were present in the resin composition due to uneven kneading and dispersing. In the foaming, gel particles were remarkable, which deteriorated the appearance of the formed product. The injection moldability and the blow moldability were not evaluated.

In Comparative Example 7, a smaller number of kneading disks were provided as in Comparative Example 6. Therefore, relatively large gel particles were present in the resin composition due to uneven kneading and dispersing, though the screw rotation speed was high. In the foaming, gel particles were remarkable, which deteriorated the appearance of the formed product. As a result of the evaluation of the injection moldability and the blow moldability of the resin composition, the injection molding cycle was longer, and the injection-molded product had a nonuniform portion. Further, the blow moldability was not good.

In Comparative Example 8, although the screw arrangement in the kneading section was of an intensive kneading and dispersing type, the screw rotation speed was too high. Therefore, the viscosity of the resin was significantly reduced due to temperature rise and shear of the resin. This made it impossible to provide a molded product and to evaluate the molded product.

Example 20

The biodegradable polyester resin composition of Example 1 was used as a material, and a tandem extrusion foaming machine (of a single-axis screw type with EXT-1=50 mmφ and EXT-2=50 mmφ including a die of 1.5 mmφ×28 Hls). While 10% of butane gas was injected as a foaming agent into the resin composition, the biodegradable polyester resin composition was kneaded under the following conditions: a melting temperature of 200° C., an EXT-2 temperature of 150° C., a die temperature of 135° C. and an extrusion rate of 7.5 kg/hr. Thus, a reticulate foam was obtained. Although the foam had open cells, the expansion ratio was 36. The reticulate foam had a uniform surface and very good appearance.

Example 21

The biodegradable polyester resin composition of Example 13 was used as a material. As a foaming agent, 1.5 mass % of a thermally decomposable foaming agent of an azodicarbonamide (VINYHOLE AC#3 available from Eiwa Kasei Co. Ltd.) was dry-blended with the resin composition, and the foaming test was performed. That is, a T-die test machine having a single-axis screw diameter of 55 mm (Throuzer's 3.5-stage static mixer having a slit length of 500 mm and a slit width of 1.2 mm) was used, and a sheet was formed under the following conditions: melting temperature of 210° C., a T-die temperature of 160° C., a screw rotation speed of 16 rpm, and an extrusion rate of 3 m/min. The sheet was a uniformly foamed closed cell sheet having an expansion ratio of 5.5. The sheet was free from larger gel particles, and had very good appearance.

Example 22

The biodegradable resin composition of Example 2 was melted at 200° C. in a single screw melt extrusion machine (having an EXT of 30 mmϕ), and extruded into 1 mm diameter filaments, which were in turn cut to a length of 1 mm to form particles. The particles were once dried and, with the use of butane gas as a foaming agent, a batch foaming test was performed (in which the particles were impregnated with the butane gas at 10 MPa at a temperature of 130° C. in an explosion-proof pressure vessel, and returned to a normal pressure level). The resulting foamed particles were highly uniform particles including closed cells, and the expansion ratio was 45.

The invention claimed is:

1. A biodegradable polyester resin composition comprising a thermoplastic polymer which comprises 100 parts by mass of an aliphatic polyester (A) and 0.01 to 5 parts by mass of a (meth)acrylic ester (B1), the (meth)acrylic ester (B1) having two or more (meth)acryl groups in the molecule thereof, the aliphatic polyester (A) being crosslinked with the (meth)acrylic ester (B1), the biodegradable polyester resin composition having a gelation index (1) of not lower than 0.1% and a gelation index (2) of not higher than 0.5%.

2. A biodegradable polyester resin composition of claim 1, wherein the aliphatic polyester (A) is a polylactic acid polymer.

3. A biodegradable polyester resin composition of claim 1, which has a melt viscosity of 0.2 to 10g/10 minutes as expressed by a melt flow rate value.

4. A preparation method for a biodegradable polyester resin composition comprising the step of melt-kneading an aliphatic polyester (A), a (meth)acrylic ester (B1), and an organic peroxide (C),
whereby the biodegradable polyester resin composition is prepared as
containing a thermoplastic polymer comprising 100 parts by mass of the aliphatic polyester (A) and 0.01 to 5 parts by mass of the (meth)acrylic ester (B1),
wherein the (meth)acrylic ester (B1) has two or more (meth)acryl groups in the molecule thereof, and the aliphatic polyester (A) is crosslinked with the (meth) acrylic ester (B1), and
having a gelation index (1) of not lower than 0.1% and a gelation index (2) of not higher than 0.5%.

5. A preparation method of claim 4, wherein the aliphatic polyester (A) is melt-kneaded, and a solution or a dispersion of the (meth)acrylic ester (B1) and the organic peroxide (C) is injected into the aliphatic polyester (A) during the melt-kneading of the aliphatic polyester (A), followed by agitating and kneading.

6. A preparation method of claim 4, wherein the aliphatic polyester (A) and the organic peroxide (C) are melt-kneaded, and a solution or a dispersion of the (meth)acrylic ester (B1) is injected into the resulting mixture during the melt-kneading of the aliphatic polyester (A) and the organic peroxide (C), followed by agitating and kneading.

7. A preparation method of claim 5,
wherein a kneader is used,
wherein a lower pressure region is defined downstream of a region in which the aliphatic polyester (A) is melted in the kneader, and the injection is carried out in the lower pressure region,
wherein the (meth)acrylic ester (B1) are agitated and kneaded in a position of the injection and/or downstream of the position of the injection with respect to a direction of flow of the melted resin in the kneader, so that the resulting biodegradable polyester resin composition has a gelation index (1) of not lower than 0.1% and a gelation index (2) of not higher than 0.5%.

8. A biodegradable resin foamed article which is produced by foaming a biodegradable polyester resin composition of claim 1.

9. A biodegradable resin molded article which is produced by extruding a biodegradable polyester resin composition of claim 1.

10. A biodegradable resin molded article which is produced by injection-molding a biodegradable polyester resin composition of claim 1.

11. A biodegradable resin molded article which is produced by blow-molding a biodegradable polyester resin composition of claim 1.

12. A preparation method of claim 6,
wherein a kneader is used,
wherein a lower pressure region is defined downstream of a region in which the aliphatic polyester (A) is melted in the kneader, and the injection is carried out in the lower pressure region,
wherein the (meth)acrylic ester (B1) are agitated and kneaded in a position of the injection and/or downstream of the position of the injection with respect to a direction of flow of the melted resin in the kneader, so that the resulting biodegradable polyester resin composition has a gelation index (1) of not lower than 0.1% and a gelation index (2) of not higher than 0.5%.

13. A biodegradable resin foamed article which is produced by foaming a biodegradable polyester resin composition of claim 2.

14. A biodegradable resin foamed article which is produced by foaming a biodegradable polyester resin composition of claim 3.

15. A biodegradable resin molded article which is produced by extruding a biodegradable polyester resin composition of claim 2.

16. A biodegradable resin molded article which is produced by extruding a biodegradable polyester resin composition of claim 3.

17. A biodegradable resin molded article which is produced by injection-molding a biodegradable polyester resin composition of claim 2.

18. A biodegradable resin molded article which is produced by injection-molding a biodegradable polyester resin composition of claim 3.

19. A biodegradable resin molded article which is produced by blow-molding a biodegradable polyester resin composition of claim 2.

20. A biodegradable resin molded article which is produced by blow-molding a biodegradable polyester resin composition of claim 3.

* * * * *